(12) United States Patent  (10) Patent No.: US 8,797,596 B2
Nishiura et al.  (45) Date of Patent: Aug. 5, 2014

(54) OPERATING DEVICE USED IN COLOR DESIGNATION UPON EXECUTING COLOR CORRECTION AND IMAGE PROCESSING APPARATUS

(71) Applicant: KYOCERA Document Solutions Inc., Osaka (JP)

(72) Inventors: Mitsuko Nishiura, Osaka (JP); Yukihiro Mori, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 13/692,543

(22) Filed: Dec. 3, 2012

(65) Prior Publication Data

US 2013/0107297 A1    May 2, 2013

(30) Foreign Application Priority Data

Oct. 31, 2011   (JP) .................................. 2011-238374

(51) Int. Cl.
 *H04N 1/60* (2006.01)
(52) U.S. Cl.
 USPC ........................................... 358/1.9; 382/276
(58) Field of Classification Search
 CPC .................................................... H04N 1/6013
 See application file for complete search history.

(56) References Cited

U.S. PATENT DOCUMENTS 5,495,539 A *  2/1996  Sieverding ..................... 382/276
5,893,130 A *  4/1999  Inoue et al. .................... 715/255
6,701,011 B1   3/2004  Nakajima

FOREIGN PATENT DOCUMENTS

| JP | 06103381 A | * | 4/1994 | .............. G06F 15/72 |
| JP | H6-103381 A | | 4/1994 | |
| JP | H8-315104 A | | 11/1996 | |
| JP | 11-32227 A | | 2/1999 | |
| JP | 11-098374 A | | 4/1999 | |
| JP | 2009-200741 A | | 9/2009 | |

OTHER PUBLICATIONS

Notice of Reasons for Rejection issued to JP Application No. 2011-238374 mailed Sep. 18, 2013.
English Translation of JP H6-103381 A.
English Translation of JP H8-315104 A.

* cited by examiner

*Primary Examiner* — Barbara Reinier
*Assistant Examiner* — Christopher D Wait
(74) *Attorney, Agent, or Firm* — Knobbe Martens Olson & Bear LLP

(57) ABSTRACT

A touch screen displays a plurality of images corresponding to a plurality of colors represented by color information stored in a color information storage unit. A selection part indicating whether the image is in a selected state or an unselected state is associated with each image displayed on the touch screen. An intermediate color calculating unit calculates color information representing an intermediate color of two colors indicated by images respectively corresponding to two selection parts in the selected state. An intermediate color adding unit displays on the touch screen an image corresponding to the intermediate color, based on color information of the intermediate color calculated by the intermediate color calculating unit, and a selection part corresponding to the image. An output unit outputs the color information of the intermediate color corresponding to the selection part if the selection part corresponding to the intermediate color is selected.

5 Claims, 11 Drawing Sheets

OPERATING DEVICE USED IN COLOR DESIGNATION UPON EXECUTING COLOR CORRECTION AND IMAGE PROCESSING APPARATUS

INCORPORATION BY REFERENCE

This application is based upon and claims the benefit of priority from the corresponding. Japanese Patent Application No. 2011-238374, filed in the Japan Patent Office on Oct. 31, 2011, the entire contents of which are incorporated herein by reference.

BACKGROUND

The present disclosure relates to an operating device used in color designation upon executing color correction or the like, and to an image processing apparatus that includes this operating device.

Devices capable of color printing are common among image forming apparatuses such as copying machines and multi-function peripherals (MFPs). This type of image forming apparatus implements color printing by combining recording agents such as toner or ink of the four colors of cyan (C), magenta (M), yellow (Y), and black (K), for example.

Many of such image forming apparatuses have a function for performing color correction on image data. Color correction includes correction to approximate a color to be corrected included in an image to a specific target color. The printing of images containing photographs, etc. has been done in recent years. Accordingly, in response to demand for changing the hue to a color felt preferable to people, such a color correction function has come to be built into image forming apparatuses. As a specific example of making the hue change to a color that a person feels preferable, there is color correction to reproduce a so-called memory color. The memory color, for example, is a color such as the skin of a person, the blue of the sky, the green of vegetation, and the red of the sunset, and is a color obtained so as to reproduce a color close to the color remembered by humans, which makes it more desirable than performing reproduction of a color faithfully from a document.

For such memory colors, there are individual differences in the preferred colors. For this reason, various techniques for adequately providing preferred colors in image forming apparatuses have been proposed.

For example, an image processing apparatus has been known that allows for a user to select his or her preferred color correction and that reflects this color correction in image processing, by printing color adjusted images consisting of a plurality of thumbnail images between which the color shade is varied slightly and allowing the user to input a number specifying a thumbnail image selected from among the printed color adjusted images.

In addition, a technology has been known that allows a user to select a color correction condition by displaying on the same screen a plurality of images generated by executing different color corrections on the same image, and allowing the user to select from these images.

With the aforementioned technology, so long as the preferred color correction is included among the suggested color correction candidates, the user will be able to easily select this color correction. However, if the preferred color correction is not included among the suggested color correction candidates, complicated operation and the like will be necessary in order to obtain the preferred color correction, and the user will not be able to easily set the desired color correction.

SUMMARY

In an aspect of the present disclosure, an operating device includes a color information storage unit, a display unit, selection parts, an intermediate color calculating unit, an intermediate color adding unit and an output unit. The color information storage unit stores color information representing a plurality of colors different from each other. The display unit displays a plurality of images corresponding to the plurality of colors represented by the color information stored in the color information storage unit. The selection parts are respectively associated with the plurality of images displayed on the display unit, and indicate whether a corresponding image is in a selected state or an unselected state. The intermediate color calculating unit calculates color information representing an intermediate color of two colors indicated by images respectively corresponding to two selection parts in the selected state, based on color information respectively corresponding to the two selection parts. The intermediate color adding unit executes an intermediate color addition to display an image corresponding to the intermediate color on the display unit, and to provide an intermediate color selection part indicating whether said image is in the selected state or the unselected state, based on color information of the intermediate color calculated by the intermediate color calculating unit. Then, the output unit outputs the color information of the intermediate color corresponding to the intermediate color selection part, if the intermediate color selection part is selected.

In another aspect of the present disclosure, an image processing apparatus includes the aforementioned operating device.

DETAILED DESCRIPTION

An embodiment of the present disclosure will be explained hereinafter in further detail while referencing the drawings. In the following, the present disclosure is embodied as a digital MFP having a function of correcting the color of pixels belonging to a specific color range in image data to a designated color, for example.

Figure 1:
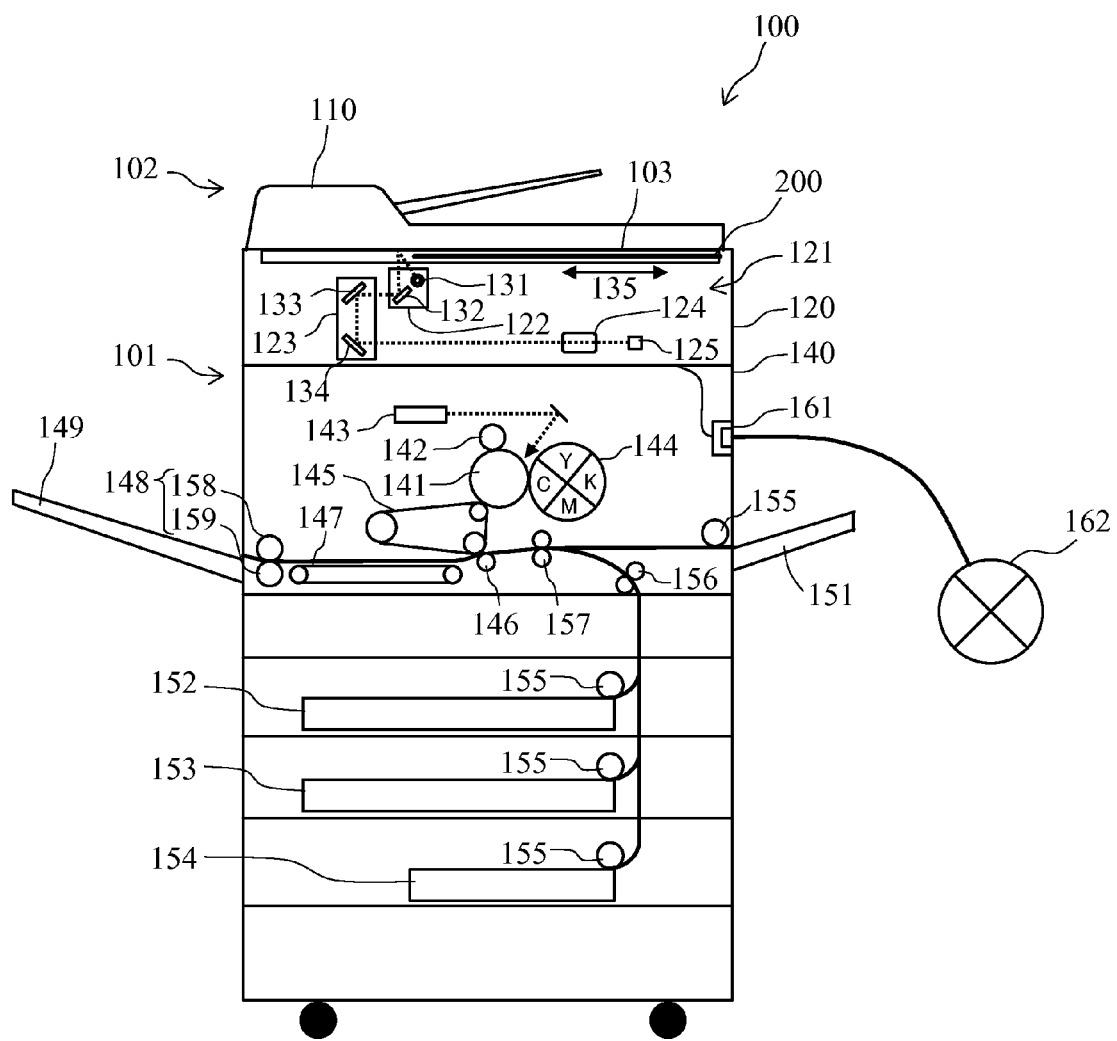
FIG. 1 is a schematic configuration diagram illustrating an overall configuration of a Multi Function Peripheral (MFP) according to an embodiment of the present disclosure.

FIG. 1 is a schematic configuration diagram illustrating an example of an overall configuration of a digital MFP according to the present embodiment. As shown in FIG. 1, an MFP 100 includes a main body 101 having an image scanning unit 120 and an image forming unit 140, and a platen cover 102 mounted above the main body 101. A document table 103 is provided on an upper surface of the main body 101. The document table 103 is opened or closed by the platen cover 102. In addition, the platen cover 102 includes a document feeder 110.

The image scanning unit 120 is provided below the document table 103. The image scanning unit 120 scans an image of a document by way of an optical scanning system 121, and generates digital data (image data) of this image. A document is placed on the document table 103 or the document feeder 110. The optical scanning system 121 includes a first carriage 122, a second carriage 123 and a condensing lens 124. A linear light source 131 and a mirror 132 are provided to the first carriage 122. Mirrors 133 and 134 are provided to the second carriage 123. The light source 131 illuminates the document. The mirrors 132, 133 and 134 lead reflected light from the document to the condensing lens 124. The condensing lens 124 forms a light image on a light receiving surface of a line image sensor 125.

In the optical scanning system 121, the first carriage 122 and the second carriage 123 are configured to be reciprocally movable in a sub scanning direction 135. The first carriage 122 and second carriage 123 move in the sub scanning direction 135, such that it is possible for the image sensor 125 to scan an image of the document placed on the document table 103. When the image of the document set on the document feeder 110 is scanned, the image scanning unit 120 temporarily fixes the first carriage 122 and the second carriage 123 according to an image scanning position, and scans the image of the document passing through the image scanning position by the image sensor 125. For example, the image sensor 125 generates image data of the document corresponding to the colors of red (R), green (G), and blue (B) from the light image incident to the light receiving surface. The generated image data is printed on a sheet of paper in the image forming unit 140. In addition, the generated image data may be transmitted to another device (not illustrated) through a network 162 by a network adapter 161.

The image forming unit 140 prints on a sheet of paper the image data obtained by the image scanning unit 120 or image data received from another device (not illustrated) connected to the network 162. The image forming unit 140 includes a photoreceptor drum 141. The photoreceptor drum 141 rotates at constant velocity in one direction. In order from an upstream side in the rotation direction, a charging unit 142, an exposing unit 143, a developing unit 144 and an intermediate transfer belt 145 are arranged around the photoreceptor drum 141. The charging unit 142 uniformly charges a surface of the photoreceptor drum 141. The exposing unit 143 irradiates the uniformly charged surface of the photoreceptor drum 141 with light according to the image data, and forms an electrostatic latent image on the surface of the photoreceptor drum 141. The developing unit 144 causes toner to adhere to this electrostatic latent image, and forms a toner image on the surface of the photoreceptor drum 141. The intermediate transfer belt 145 transfers the toner image on the surface of the photoreceptor drum 141 to the sheet of paper. When the image data is for a color image, the intermediate transfer belt 145 transfers toner images of respective colors to the same sheet of paper. It should be noted that a color image of the RGB format is converted into image data of the CMYK format (cyan (C), magenta (M), yellow (Y), and black (K)), and image data of the respective colors is input to the exposing unit 143.

The image forming unit 140 feeds a sheet of paper to a transfer location between the intermediate transfer belt 145 and the transfer roller 146 from a manual feeding tray 151, paper cassettes 152, 153, and 154, or the like. Sheets of paper having various sizes are stacked or stored on the manual feeding tray 151 or each of the paper cassettes 152, 153, and 154. The image forming unit 140 selects a sheet of paper designated by a user or a sheet of paper according to an automatically detected size of a document, and feeds the selected sheet of paper from the manual feeding tray 151 or the paper cassettes 152, 153, and 154 by way of the feeding roller 155. The fed sheet of paper is conveyed to the transfer location by a conveyance roller 156 and a registration roller 157. The sheet of paper to which the toner image has been transferred is conveyed to a fusing unit 148 by a conveying belt 147. The fusing unit 148 includes a fuser roller 158 having a built-in heater and a pressure roller 159, and fuses the toner image to the sheet of paper by applying heat and pressure. The image forming unit 140 discharges the sheet of paper having passed through the fusing unit 148 to a discharge tray 149.

Figure 2:
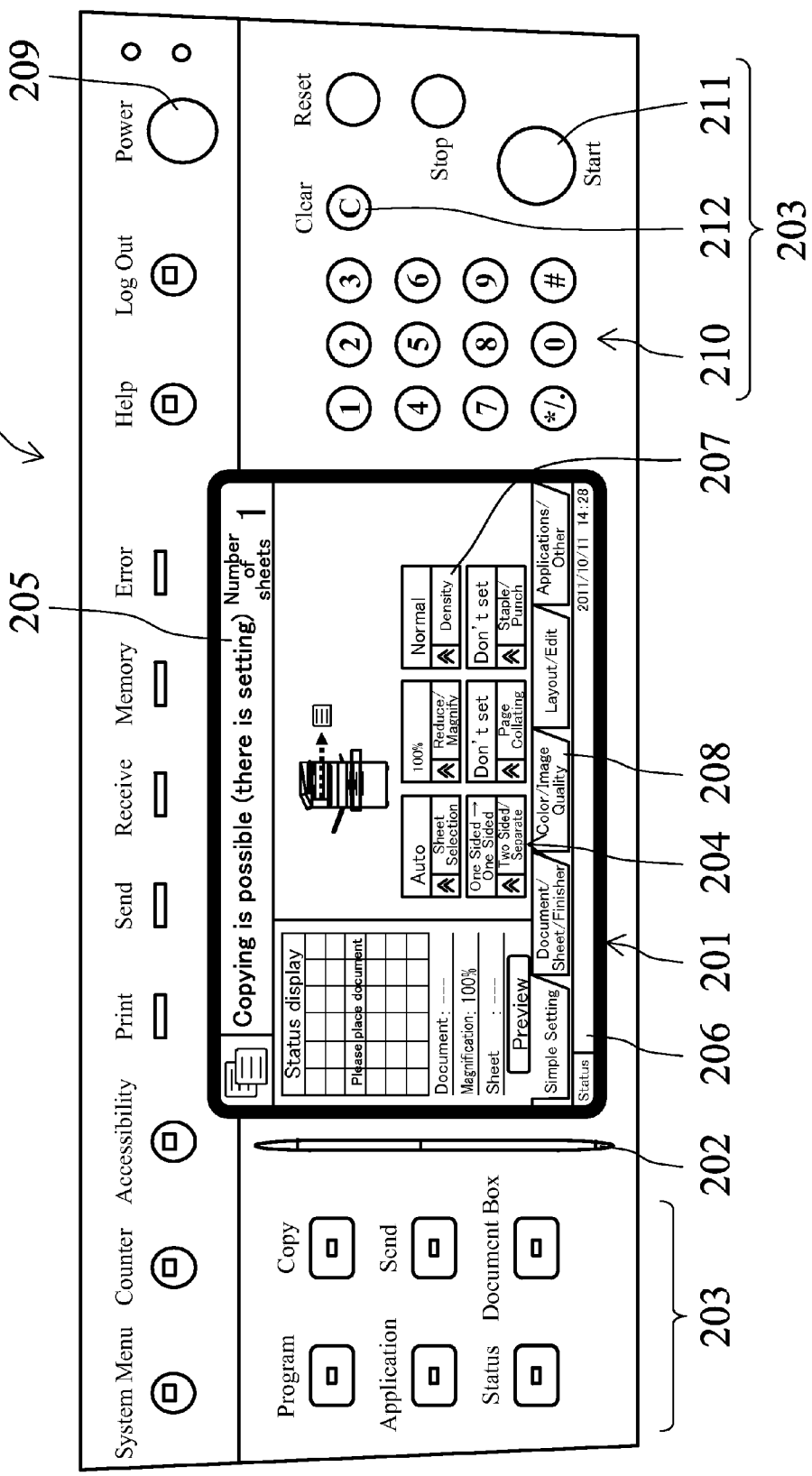
FIG. 2 is a schematic diagram illustrating an operating panel of the MFP according to the embodiment of the present disclosure.

FIG. 2 is a diagram illustrating an example of an external appearance of an operating panel included in the MFP. The user can give an instruction for starting a copying operation and other instructions to the MFP 100, and check the status and settings of the MFP 100 using an operating panel 200. A touch screen 201 (display with a touch panel) and operating keys 203 are arranged at the operating panel 200. The touch screen 201 includes a display surface, configured with a liquid crystal display or the like, which displays operating buttons, messages, and the like, and a sensor that detects a pressing position on the display surface. The method of detecting the pressing position is not particularly limited, and any type such as a resistive film type, a capacitive type, a surface acoustic wave (SAW) type, and an electromagnetic type may be employed. The user can perform input through the touch screen 201 using his/her finger or a touch pen 202.

The touch screen 201 displays an operation screen including a button display portion 204, a message display portion 205, and a status display portion 206. A plurality of tabs 208 is arranged in the button display portion 204. For each of the plurality of tabs 208, operating buttons corresponding to a category thereof are arranged. A "simple setting" tab includes operating buttons used for basic setting. In an example of FIG. 2, operating buttons are arranged, which are for setting a sheet size, copying magnification, density, a print side, page collating, and post processing. For example, when the user performs an operation of pressing a "density" button 207, a pop-up screen including buttons for selecting the density such as "fine", "normal", and "thick" is displayed superimposed over the "density" button 207. The density is set by the user's selection (pressing). In the example of FIG. 2, a "document/sheet/finisher" tab, a "color/image quality" tab, a "layout/edit" tab, and a "applications/other" tab are also provided in addition to the "simple setting" tab. The user can change to a display of one of the plurality of tabs 208 by performing an operation of selecting a tab. While one tab is selected, the other tabs or elements thereof are hidden on the operation screen. It should be noted that, with the MFP 100, color correction, which will be described later, may be executed by pressing a "one touch image quality adjusting" button included in the "color/image quality" tab.

A message for notifying the user of settings, such as whether a copying operation can be performed and the number of sheets to copy, is displayed on the message display portion 205. In addition, apparatus status information is displayed on the status display portion 206 when necessary. Detection results of various sensors included in the MFP 100 are reflected on this display. Apparatus status information refers to a message for notifying the user of an alert for prompting a response to an abnormality, despite the apparatus being in an operable state. Apparatus status information, for example, includes information representing that the number of remaining sheets of paper is small, information representing that the document table 103 is soiled, and information representing that a facsimile document is stored in memory when a facsimile memory reception is set. In addition, the apparatus status information may include out of paper information, conveying jam information, and the like.

The operating keys 203 include a main power key 209, a numeric keypad 210, a start key 211, a clear key 212, and the like. For example, the power key 209 is used to turn the MFP 100 on and off. The numeric keypad 210 may be used for designating the number of sheets to copy or for setting the copying magnification. When the user makes these settings, the MFP 100 displays a message like "copying is possible (there is setting)" on the message display portion 205, and thus notifies that setting has been made by the user. The start key 211 is used to give an instruction for starting a copying operation or an image printing operation. The user operates the clear key 212 when he/she releases setting made by himself/herself. Since it can be determined based on the above described message whether a machine has accepted settings made by the user, the user may operate the clear key 212 when the setting becomes unnecessary.

Figure 3:
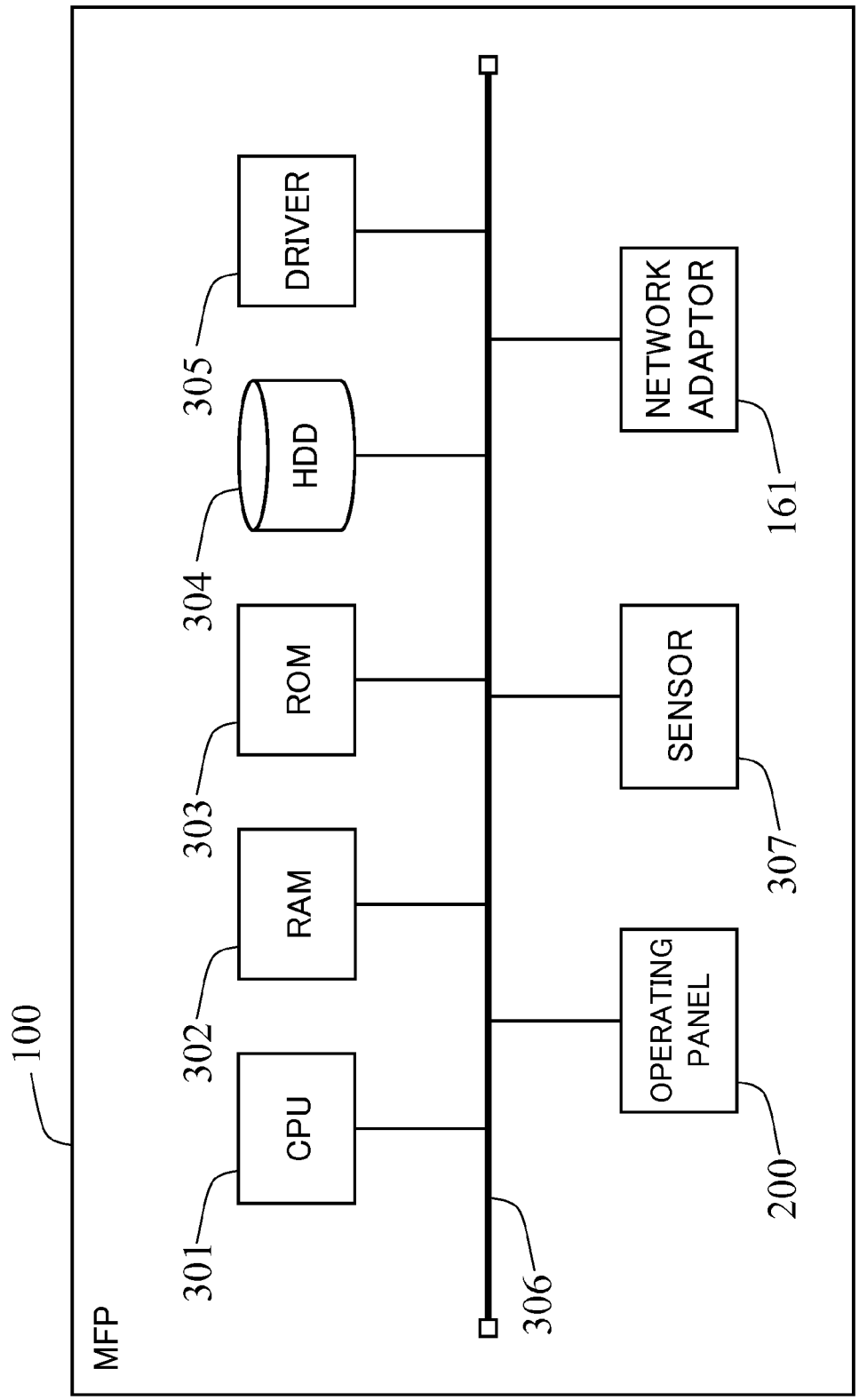
FIG. 3 is a diagram illustrating a hardware configuration of the MFP according to the embodiment of the present disclosure.

FIG. 3 is a hardware configuration view of a control system in an MFP. In the MPF 100 of the present embodiment, a central processing unit (CPU) 301, a random access memory (RAM) 302, a read only memory (ROM) 303, a hard disk drive (HDD) 304, and a driver 305 that supports respective driving units in the document feeder 110, the image scanning unit 120, and the image forming unit 140 are connected via an internal bus 306. The ROM 303, the HDD 304, or the like store a program. The CPU 301 controls the MFP 100 according to a command of a control program thereof. For example, the CPU 301 uses the RAM 302 as a working area, and transfers data or commands with the driver 305 to control the operation of each driving unit. The HDD 304 is also used to accumulate image data obtained from the image scanning unit 120 and image data received from another apparatus via the network adapter 161.

The operating panel 200 and various sensors 307 are also connected to the internal bus 306. The operating panel 200 receives a user's operation and supplies the CPU 301 with a signal based on the operation. The touch screen 201 displays the aforementioned operation screen according to a control signal from the CPU 301. The sensors 307 include various sensors such as sensors for detecting opening or closing of the platen cover 102, detecting a document set on the document table 103, detecting a temperature of the fusing unit 148, and detecting a conveyed sheet of paper or document. For example, the CPU 301 executes a program stored in the ROM 303, so that it implements the following units (functional blocks) and controls operations of the respective units according to signals from the sensors.

Figure 4:
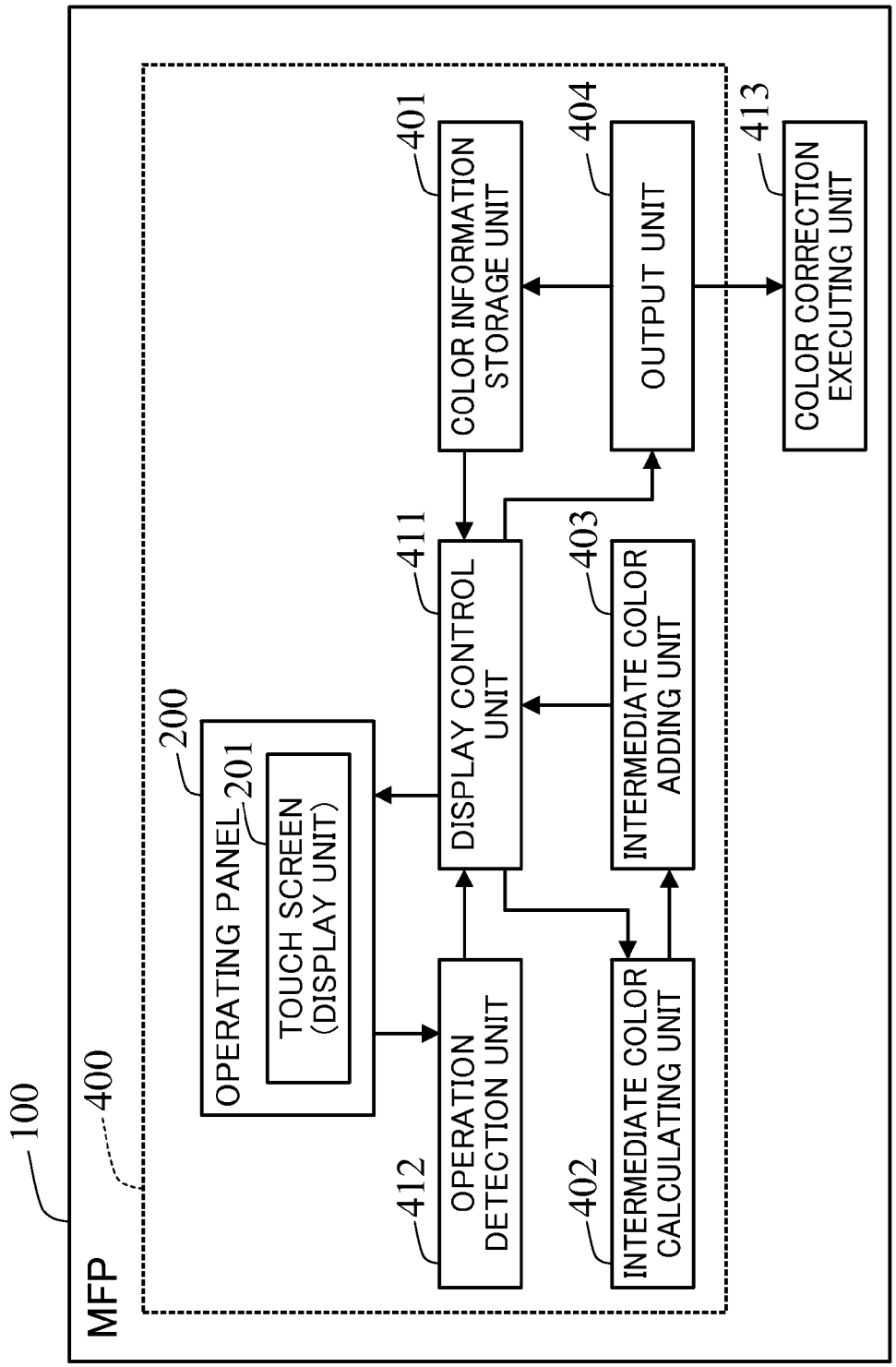
FIG. 4 is a functional block diagram illustrating the MFP according to the embodiment of the present disclosure.

FIG. 4 is a functional block diagram of the MFP of the present embodiment. As shown in FIG. 4, the MFP 100 of the present embodiment includes a color information storage unit 401, an intermediate color calculating unit 402, an intermediate color adding unit 403 and an output unit 404. In this example, a display control unit 411 and an operation detecting unit 412 as well as the operating panel 200, color information storage unit 401, intermediate color calculating unit 402, intermediate color adding unit 403, and output unit 404, constitute the operating device 400. Although not particularly limited, a user uses the operating device 400 when he/she designates a target color for color correction in which the color of pixels belonging to a specific color range in image data is approximated to a designated color (hereinafter referred to as target color) in the present embodiment. It should be noted that the aforementioned color correction on image data of a color correction object is executed by the color correction executing unit 413. The specific contents of color correction executed by the color correction executing unit 413 are not directly related to the present disclosure, and thus an explanation thereof will be omitted herein.

The color information storage unit 401 stores color information indicating a plurality of colors different from each other. This color information is information indicating colors that can be designated as the aforementioned target color, and registered in the MFP 100 in advance. This color information is read by the display control unit 411. The colors corresponding to this color information are displayed on the display surface of the touch screen 201 as elements in a selection screen. Although not particularly limited, the color coordinates in CIE L*C*h color space are stored as color information herein. In addition, in the present embodiment, the image data includes color information expressed by color components constituting an absolute color space such as standard RGB (sRGB), and is easily transformable into an expression in the CIE L*C*h color space. For a case where the image data includes color information expressed in a device-dependent RGB format, the MFP 100 converts the color information into color information expressed in the absolute color space.

The display control unit 411 displays the aforementioned operation screen, selection screen, etc. on the display surface of the touch screen 201. The display control unit 411 stores information indicating the display position of each element such as operating buttons (selection parts) included in the operation screen and selection screen (e.g., coordinates on the display surface). An operation made to the display surface of the touch screen 201 is detected by a sensor that detects a pressing position on the touch screen 201. The coordinates of the pressing position on the touch screen 201 are acquired by the operation detection unit 412. The display control unit 411 recognizes the contents of an operation performed by a user based on the pressing position detected by the operation detection unit 412 and the coordinates of the screen element stored therein. In addition, the operation detection unit 412 also recognizes pressing of an operation key 203 on the operating panel 200.

For example, if a user presses a "one touch image quality adjusting" button included in the "color/image quality" tab of the operation screen, and the operation detection unit 412 recognizes this pressing operation, the display control unit 411 will display a color range selection screen requesting for selection of a color range to be the aforementioned object of color correction on the touch screen 201.

Figure 5:
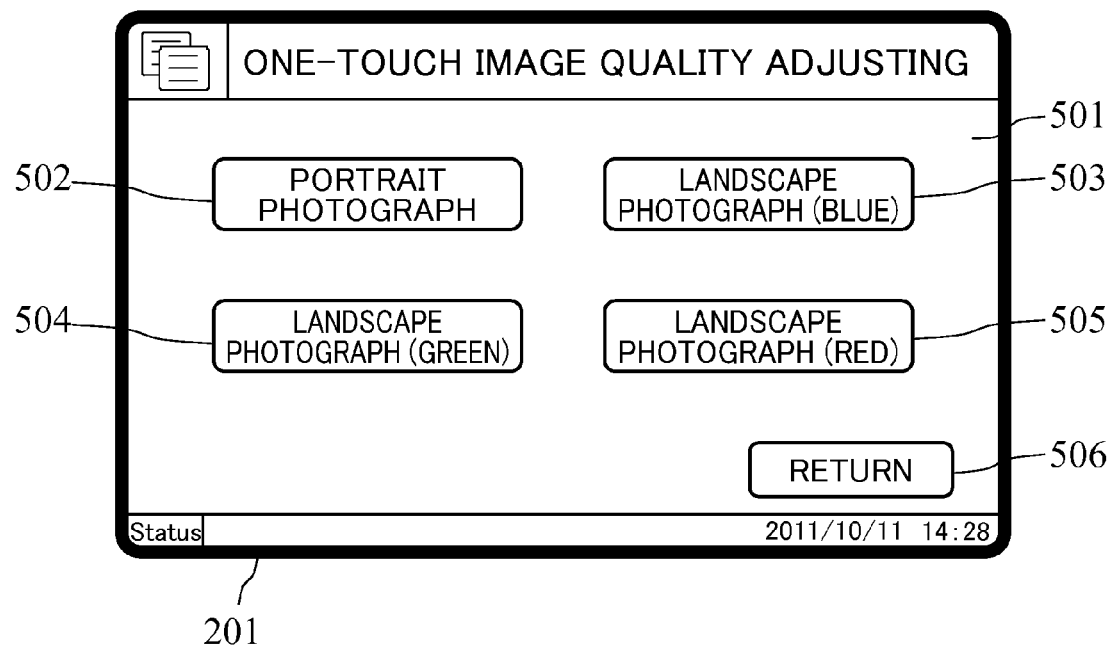
FIG. 5 is a diagram illustrating an example of a color range selection screen displayed by the MFP according to the embodiment of the present disclosure.

FIG. 5 is a diagram illustrating an example of the color range selection screen displayed on the touch screen 201 at this time. In this example, a color range selection screen 501 includes selecting buttons 502 to 505 used in the selection of a color range, and a "return" button 506. The "return" button 506 is used for interrupting a selection operation and returning to an immediately previous screen. FIG. 5 illustrates an example of the selecting buttons 502 to 505, which function respectively as a "portrait photograph" button 502 corresponding to a flesh color which is one memory color, a "landscape photograph (blue)" button 503 corresponding to a blue color which is one memory color, a "landscape photograph (green)" button 504 corresponding to a green color which is one memory color, and a "landscape photograph (red)" button 505 corresponding to a red color which is one memory color.

When a user presses a selecting button ("landscape photography (blue)" button 503) for selecting one color range (e.g., blue) from the plurality of color ranges in this color range selection screen 501, and the operation detection unit 412 recognizes this pressing operation, the display control unit 411 displays a target color selection screen requesting the selection of a target color on the touch screen 201.

Figure 6:
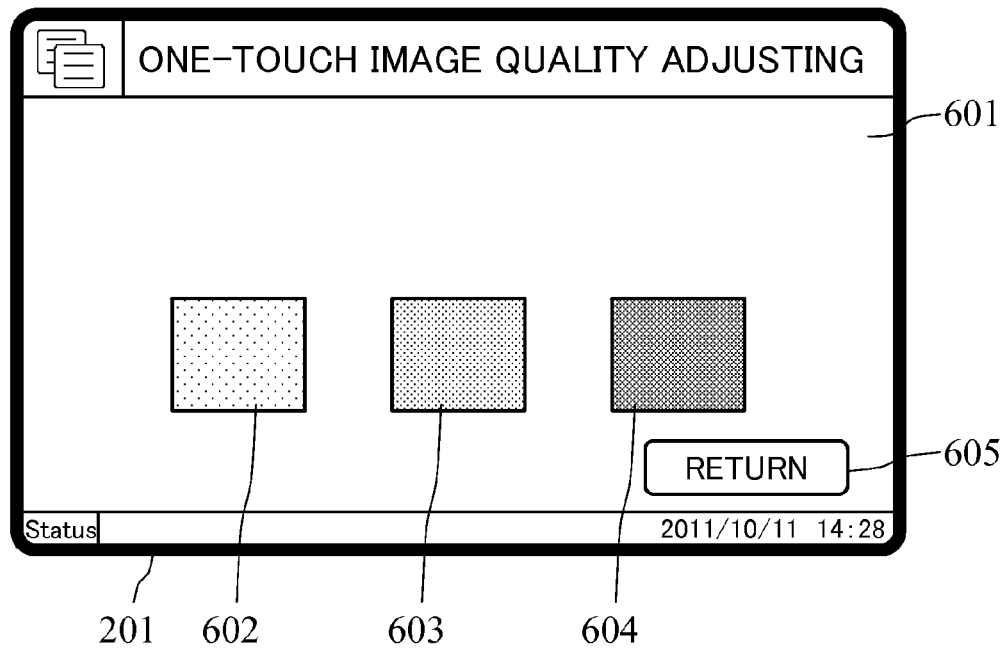
FIG. 6 is a diagram illustrating an example of a target color selection screen displayed by the MFP according to the embodiment of the present disclosure.

FIG. 6 is a diagram showing an example of the target color selection screen displayed on the touch screen 201 at this time. In this example, a target color selection screen 601 includes rectangular images 602 to 604 colored by target colors, respectively. In this diagram, the rectangular image 602 corresponds to a first target color (hereinafter referred to as "blue 1"), the rectangular image 603 corresponds to a second target color (hereinafter referred to as "blue 2"), and the rectangular image 604 corresponds to a third target color (hereinafter referred to as "blue 3"). The respective rectangular images 602 to 604 are generated by the display control unit 411 based on color information read from the color information storage unit 401. In other words, the display control unit 411 reads color information associated with a color range selected on the color range selection screen 501 from the color information storage unit 401, and generates the rectangular images 602 to 604 colored by the colors indicated by this color information. As the first to third target colors, a bright blue color, a deep blue color without green, a blue color with green (so-called emerald green), or the like are set.

In addition, with the present embodiment, the respective rectangular images 602 to 604 will show whether they are in a selected state or unselected state, as well as functioning as selection parts used in the selection of a target color corresponding thereto. Herein, a state in which a finger, etc. of a user is contacting a rectangular image displayed on the display surface of the touch screen 201 is a selected state, and a state in which a finger, etc. of the user is not contacting therewith is an unselected state. In addition, although not particularly limited, when a rectangular image in the selected state satisfies a selection fixing condition described later, selection by the user is fixed in the present embodiment. For example, when the rectangular image 602 of "blue 1" is in the selected state and the selection fixing condition is satisfied on the target color selection screen 601, "blue 1" will be designated as the target color. This designation is notified from the display control unit 411 to the output unit 404. Accordingly, the output unit 404 outputs the color range and target color to the color correction executing unit 413.

The intermediate color calculating unit 402 calculates color information indicating an intermediate color between two colors respectively corresponding to the two rectangular images in the selected state on the target color selection screen 601. In addition, the intermediate color adding unit 403 executes an intermediate color addition. Herein, the intermediate color addition is an action to display a rectangular image corresponding to the intermediate color on the touch screen 201, based on the color information of the intermediate color calculated by the intermediate color calculating unit 402. It should be noted that, in the present embodiment, the intermediate color adding unit 403 performs this display through the display control unit 411. It should be noted that, similarly to the aforementioned rectangular images 602 to 604, the rectangular image corresponding to the intermediate color also functions as a selection part (intermediate color selection part) used for selecting the color corresponding thereto.

The intermediate color adding unit 403 continues the intermediate color addition for a case where at least one of two selection parts continues to be in the selected state, and stops the intermediate color addition for a case where the two selection parts both transition to the unselected state.

For a case where the rectangular image indicating the intermediate color displayed by the intermediate color adding unit 403 on the touch screen 201 is selected, the output unit 404 outputs color information of the intermediate color corresponding to this rectangular image to the color correction executing unit 413.

Figure 7:
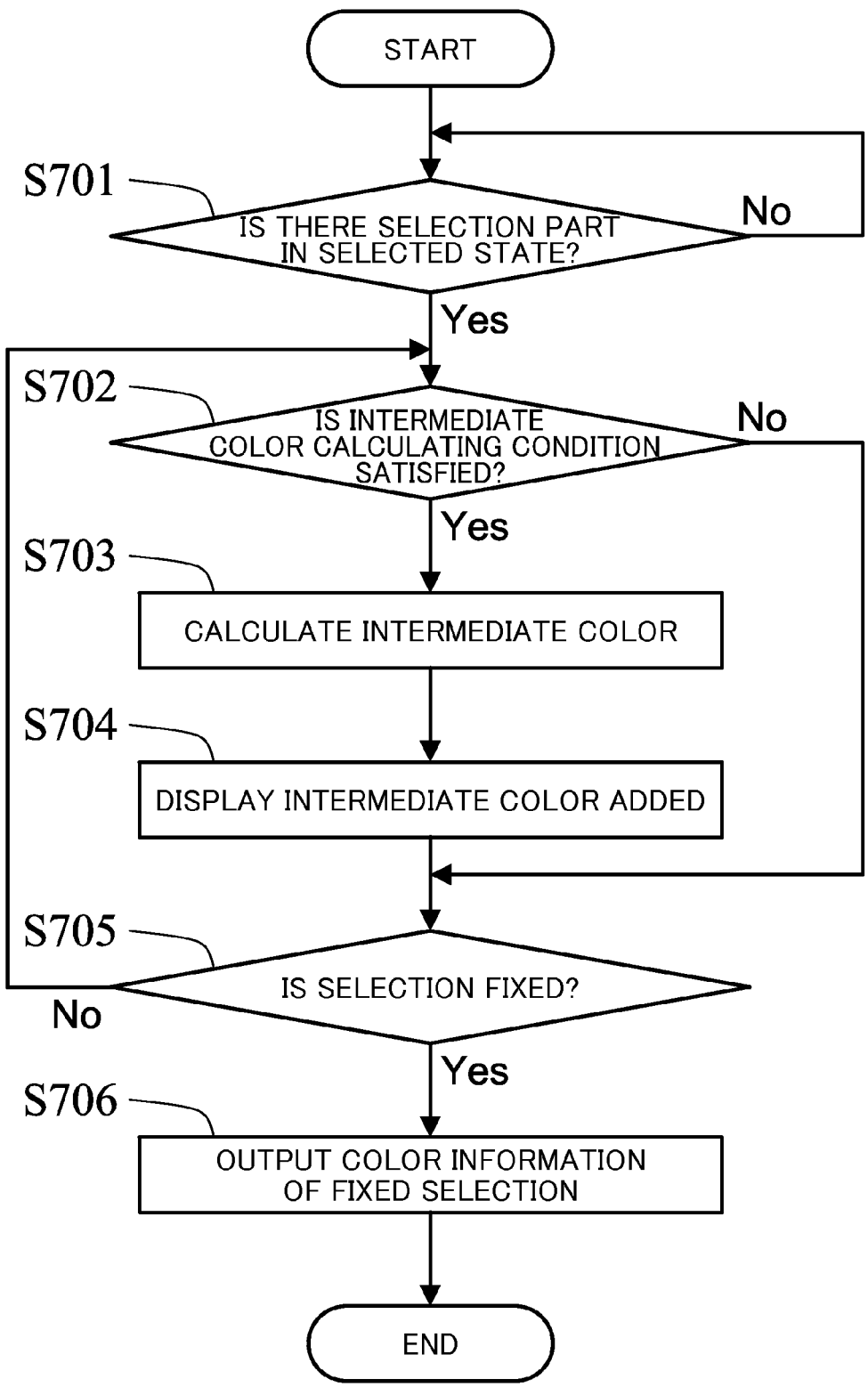
FIG. 7 is a flowchart showing an example of a color designation procedure executed by the MFP according to the embodiment of the present disclosure.

FIG. 7 is a flowchart illustrating an example of a target color selection procedure executed by the MFP 100. This procedure advances while triggered by a display of the aforementioned target color selection screen 601. When this procedure begins, the display control unit 411 is in standby until at least one among the rectangular images 602, 603 and 604 functioning as selection parts turns to be in a selected state on the target color selection screen 601 (Step S701: NO).

When a user presses any of the rectangular images 602, 603 and 604 to cause it transition from the unselected state to the selected state, the display control unit 411 determines whether the selection status of the respective rectangular images 602, 603 and 604 on the target color selection screen 601 satisfies the intermediate color calculation condition (Step S701: YES; Step S702). Herein, "plurality of rectangular images is in the selected state" is set as the intermediate color calculation condition. For example, for a case where only the rectangular image 602 of "blue 1" is in the selected state on the target color selection screen 601, the display control unit 411 determines that the intermediate color calculation condition is not satisfied (Step S702: NO). On the other hand, for a case where the rectangular image 602 of "blue 1" and the rectangular image 603 of "blue 2" are in the selected state on the target color selection screen 601, the display control unit 411 determines that the intermediate color calculation condition is satisfied (Step S702: YES).

The display control unit 411 having determined the intermediate color calculation condition as being satisfied inputs color information corresponding to the rectangular images that are in the selected state on the target color selection screen 601 to the intermediate color calculating unit 402. The intermediate color calculating unit 402 having received this input calculates an intermediate color based on the inputted color information (Step S703).

For example, for a case where the rectangular image 602 of "blue 1" and the rectangular image 603 of "blue 2" are in the selected state on the target color selection screen 601, the display control unit 411 inputs the color information of "blue 1" and the color information of "blue 2" to the intermediate color calculating unit 402. In this case, the intermediate color calculating unit 402 calculates color information of an intermediate color between "blue 1" and "blue 2" based on the color information of "blue 1" and color information of "blue 2". As described above, color information is color coordinates within CIE L*C*h color space in the present embodiment. For this reason, the intermediate color calculating unit 402 calculates color information corresponding to an intermediate point between "blue 1" and "blue 2" in CIE L*C*h color space.

The intermediate color calculating unit 402 having calculated the color information of the intermediate color inputs the calculated color information into the intermediate color adding unit 403. In response to this input, the intermediate color adding unit 403 generates a rectangular image (hereinafter referred to as intermediate color rectangular image) colored by the inputted intermediate color, and displays this rectangular image on the touch screen 201 through the display control unit 411 (Step S704). It should be noted that, similarly to the rectangular images 602 to 604, the intermediate rectangular image displayed on the touch screen 201 functions as an intermediate color selection part used for selecting this intermediate color.

Figure 8:
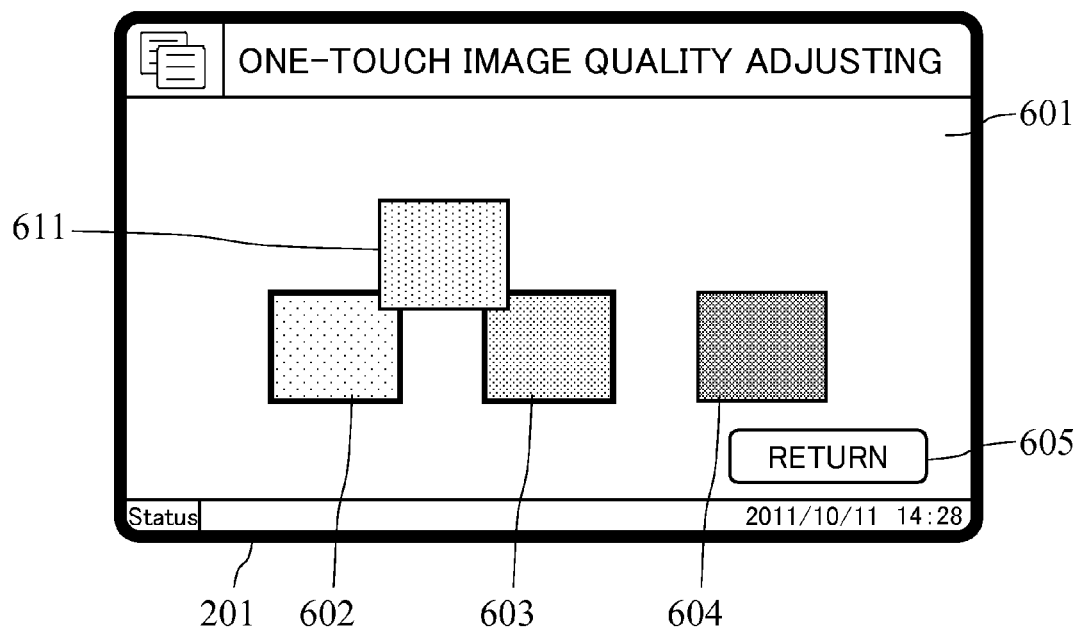
FIG. 8 is a diagram showing an example of a target color selection screen displayed by the MFP according to the embodiment of the present disclosure.

FIG. 8 is a diagram illustrating the target color selection screen 601 on which the intermediate color rectangular image is displayed. In FIG. 8, rectangular images having a border illustrated by bold lines are in the selected state. In this example, the rectangular image 602 of "blue 1" and the rectangular image 603 of "blue 2" are in the selected state. Although not particularly limited, the added intermediate color rectangular image 611 is displayed overlapping partially with the rectangular image 602 of "blue 1" and the rectangular image 603 of "blue 2", based on which the calculation has been made, in this example. In addition, the intermediate color adding unit 403 according to the present embodiment continues the display of the intermediate color rectangular image 611 until an erase operation on the intermediate color rectangular image 611 is conducted by a user. Therefore, the display of the intermediate color rectangular image 611 is continued even when the user switches the rectangular image 602 of "blue 1" and the rectangular image 603 of "blue 2" to the unselected state after the intermediate color rectangular image 611 has been displayed. The erase operation of the intermediate color rectangular image 611, for example, can be executed by drag-and-dropping the intermediate color rectangular image 611 over either of the rectangular image 602 and 603 of the calculation basis, tapping the intermediate color rectangular image 611, or the like.

When the intermediate color rectangular image 611 is displayed in the manner described above, the display control unit 411 determines whether the selection fixing conditions are satisfied (Step S705). Herein, "one rectangular image is in the selected state for a predetermined time period" is set as the selection fixing condition. It is sufficient if the predetermined time period is an amount that prevents confusion with other operations and malfunctions. The predetermined time period may be set to 1 second, for example. It should be noted that, this selection fixing condition permits 1 second for a time difference that may occur when two rectangular images are set to the selected state simultaneously.

Figure 9:
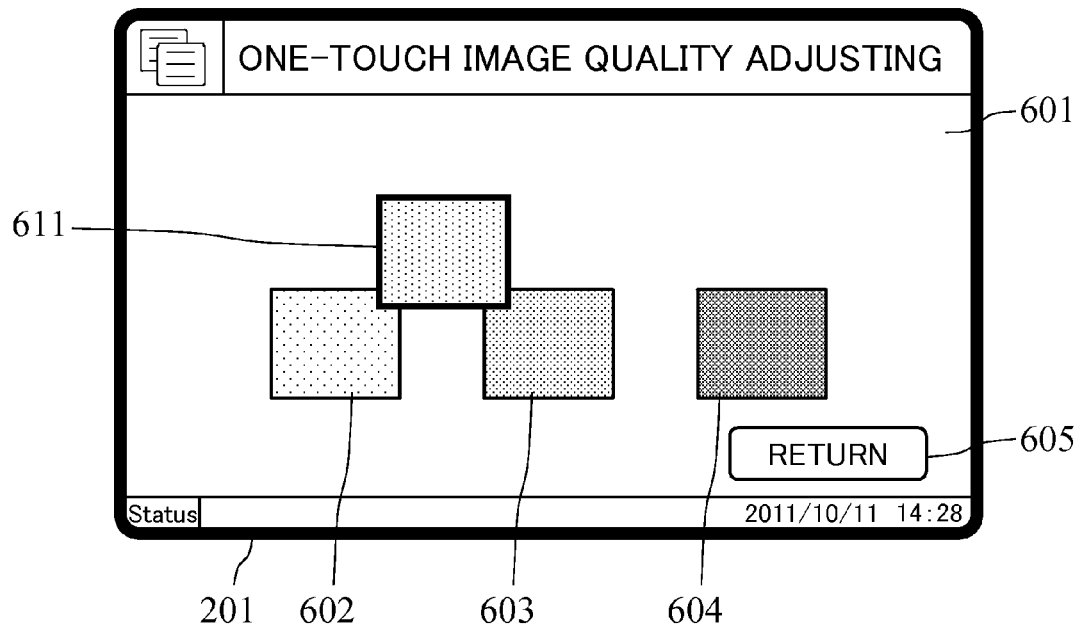
FIG. 9 is a diagram showing an example of a target color selection screen displayed by the MFP according to the embodiment of the present disclosure.

As shown in FIG. 9, it is supposed that a user presses the intermediate color rectangular image 611 in a state in which the intermediate color rectangular image 611 is displayed on the target color selection screen 601. Since the selection fixing condition is not satisfied upon first pressing, the selection by the user has not been fixed (Step S705: NO; Step S702: NO; Step S705). If this pressing is continued for 1 second and the selection fixing condition is satisfied, the display control unit 411 fixes the selection of the intermediate color rectangular image 611 (Step S705: YES). In this case, the display control unit 411 notifies the output unit 404 of the color information corresponding to the rectangular image for which the selection is fixed. The output unit 404 having received this notification outputs the notified color information to the color correction executing unit 413 (Step S706). Although not particularly limited, for a case where the rectangular image for which the selection is fixed is an intermediate color rectangular image, the display control unit 411 notifies the output unit 404 that color information is an intermediate color for which the color information has been newly generated as well as the color information, in the present embodiment. Then, the output unit 404 having received this notification saves the inputted color information in the color information storage unit 401. Accordingly, the rectangular image corresponding to this color information comes to be displayed in a selectable state from the very beginning on the target color selection screen 601, when subsequent selection of a target color is performed.

It should be noted that the selection of the intermediate color rectangular image is not limited to an operation applied to the intermediate color rectangular image to be selected. Such selection may be fixed based on an operation applied to two rectangular images from which the intermediate color rectangular image is calculated. For example, in the example illustrated in FIG. 8, the selection of the intermediate color rectangular image 611 may be fixed, for a case where a user sets again the rectangular image 602 and rectangular image 603 to the selected state, or for a case where the user continues the selected state of the rectangular image 602 and rectangular image 603 for a predetermined time period (e.g., 3 seconds). In this case, the intermediate color adding unit 403 makes the rectangular image 602 and rectangular image 603 function as intermediate color selection parts. That is, the intermediate color adding unit 403 includes an intermediate color selection part.

On the other hand, for a case where only a single rectangular image (rectangular image 602 of "blue 1" in the aforementioned example) is in the selected state, and the display control unit 411 determines the intermediate color calculation conditions as not being satisfied in a step of determining the aforementioned intermediate color calculation conditions (Step S702), the display control unit 411 determines whether the selection fixing condition is satisfied (Step S702: NO; Step S705). Then, if the selection fixing condition is satisfied, the display control unit 411 fixes the selection of this rectangular image, and notifies the output unit 404 of the color information corresponding to this rectangular image. The output unit 404 having received this notification outputs the notified color information to the color correction executing unit 413 (Step S706).

Figure 10:
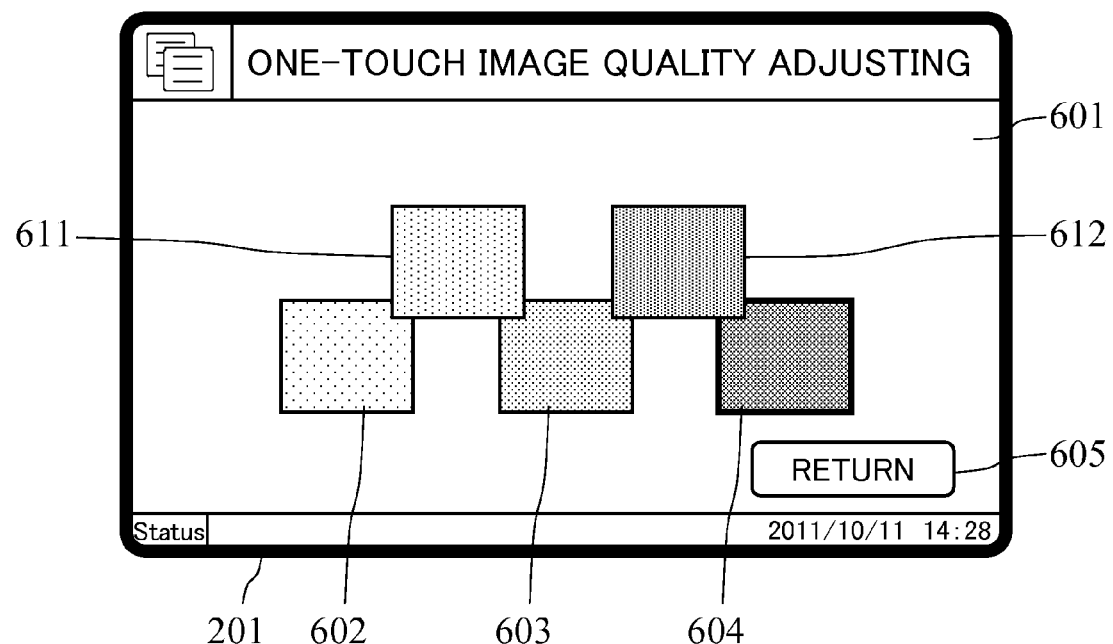
FIG. 10 is a diagram illustrating an example of a target color selection screen displayed by the MFP according to the embodiment of the present disclosure.

In addition, for a case where a user selects two other rectangular images without selecting the intermediate color rectangular image 611 on the target color selection screen 601 (refer to FIG. 8) on which the intermediate color rectangular image 611 is displayed, a new intermediate color rectangular image corresponding to these two other rectangular images is generated (Step S705: NO; Step S702: YES; Steps S703, S704, S705). For example, as shown in FIG. 10, for a case where the user sets the rectangular image 603 of "blue 2" and the rectangular image 604 of "blue 3" to the selected state in the example shown in FIG. 8, the intermediate color calculating unit 402 calculates color information of an intermediate color between "blue 2" and "blue 3" based on the color information of "blue 2" and the color information of "blue 3". Then, the intermediate color adding unit 403 displays a rectangular image 612 colored by the inputted intermediate color on the touch screen 201. Although not particularly limited, the added intermediate color rectangular image 612 is displayed partially overlapping with the rectangular image 603 of "blue 2" and the rectangular image 604 of "blue 3" based on which the calculation is performed, in the present example.

Figure 11:
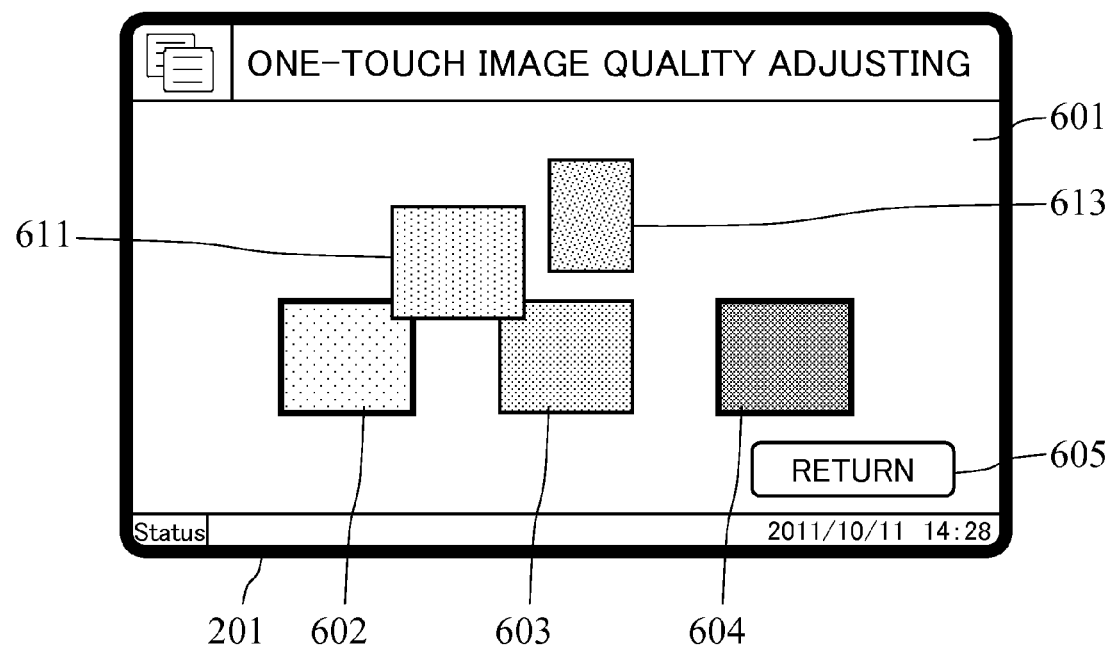
FIG. 11 is a diagram illustrating an example of a target color selection screen displayed by the MFP according to the embodiment of the present disclosure.

In addition, as shown in FIG. 11, for a case where the user sets the rectangular image 602 of "blue 1" and the rectangular image 604 of "blue 3" to the selected state in the example shown in FIG. 8, the intermediate color calculating unit 402 calculates color information of an intermediate color between "blue 1" and "blue 3" based on the color information of "blue 1" and the color information of "blue 3". Then, the intermediate color adding unit 403 displays a rectangular image 613 colored by the inputted intermediate color on the touch screen 201. Although not particularly limited, the added intermediate color rectangular image 613 in this example is displayed between the rectangular image 602 of "blue 1" and the rectangular image 604 of "blue 3" based on which the calculation is performed.

For a case where a plurality of intermediate colors is generated in this manner while the same color or proximate colors have already been displayed on the touch screen 201, it may be preferable that the display control unit 411 notifies the user of such situation by displaying it on the touch screen 201 or the like, and causes the touch screen 201 not to display this intermediate color rectangular image. It may be that the calculation of an intermediate color is performed based on any combination of rectangular images and intermediate color rectangular images displayed on the touch screen 201, such as between the rectangular image 602 and the intermediate color rectangular image 611, and between the intermediate color rectangular image 611 and the intermediate color rectangular image 612.

As explained in the foregoing, with the MFP 100, it is possible to easily generate an intermediate color and select the intermediate color at a time of color correction, etc., for example, even for a case where there is not a desired color among the plurality of colors displayed, under the condition that one color from among the plurality of colors displayed on the touch screen 201 is selected. In addition, since the MFP 100 is configured such that the color information of an intermediate color is registered in the color information storage unit 401 when the intermediate color is selected, this intermediate color will be displayed on the touch screen 201 as a selectable color from a subsequent time on.

Figure 12:
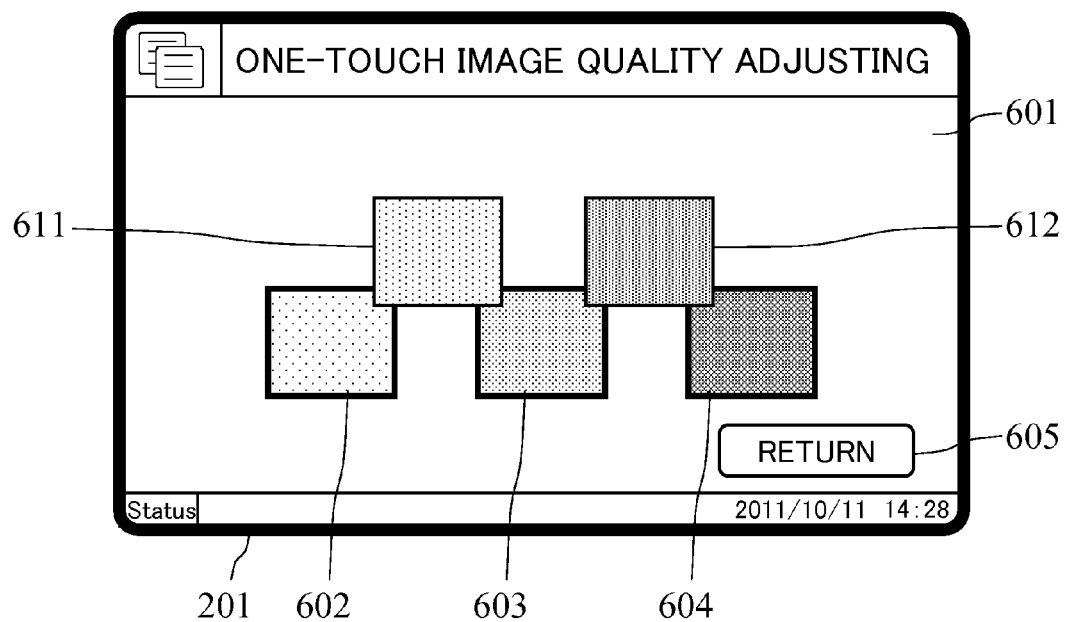
FIG. 12 is a diagram illustrating an example of a target color selection screen displayed by the MFP according to the embodiment of the present disclosure.

It should be noted that, although an example of two rectangular images being in the selected state has been explained in the foregoing, it is the same for a case where three or more rectangular images are in the selected state. In this case, it may be that intermediate colors are calculated for all possible combinations of two colors corresponding to all rectangular images in the selected state, and displayed on the touch screen 201. However, for a case where the rectangular images 602 to 604 are arranged in order of shades for the color blue in the example of FIG. 6, for example, it may be preferable to obtain an intermediate color between two colors adjacent to each other. FIG. 12 is a diagram illustrating a case of the user having set all rectangular images 602 to 604 in the example shown in FIG. 6 to the selected state. In this example, the display control unit 411 inputs a set of the color information of "blue 1" and the color information of "blue 2" and a set of the color information of "blue 2" and the color information of "blue 3" to the intermediate color calculating unit 402. The intermediate color calculating unit 402 calculates color information of the intermediate color between "blue 1" and "blue 2" and color information of the intermediate color between "blue 2" and "blue 3" based on this input. The intermediate color adding unit 403 displays the rectangular images 611 and 612 colored by the inputted intermediate colors on the touch screen 201.

Figure 13:
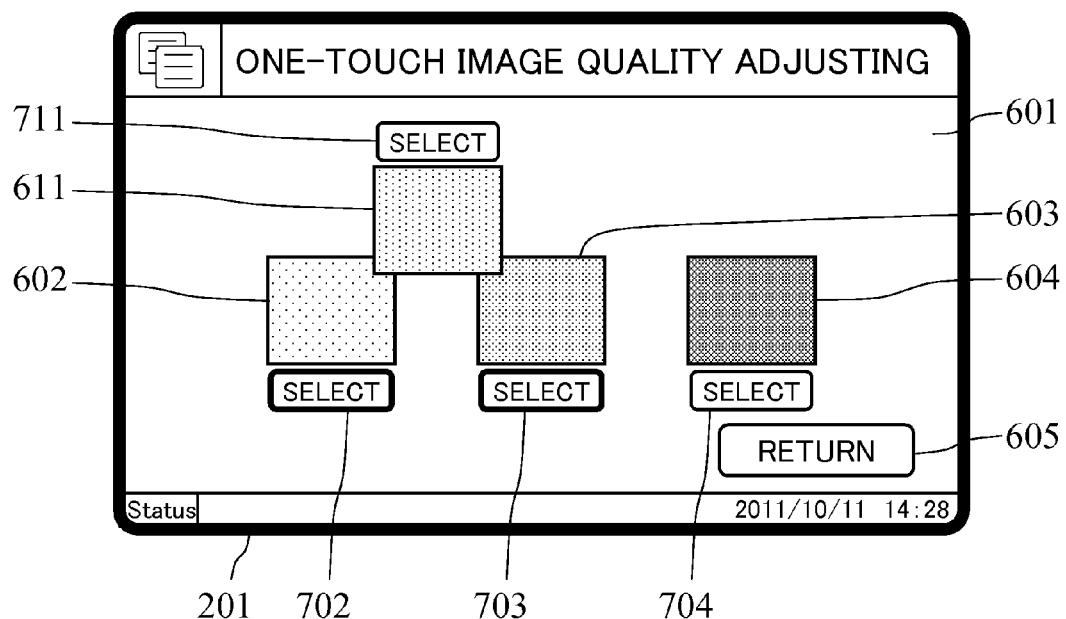
FIG. 13 is a diagram illustrating an example of a target color selection screen displayed by the MFP according to the embodiment of the present disclosure.

In addition, as a preferable example, a configuration has been explained in the foregoing in which the rectangular images 602 to 604 also function as selection parts, and the intermediate color rectangular images 611 to 613 also serve as intermediate color selection parts. However, it is not essential for the rectangular images and the intermediate color rectangular images to concurrently function as selection parts and intermediate color selection parts. For example, as shown in FIG. 13, selection parts and an intermediate color selection part may be provided independently. In the example shown in FIG. 13, a selecting button 702 used for selecting the rectangular image 602, a selecting button 703 used for selecting the rectangular image 603, and a selecting button 704 used for selecting the rectangular image 604 are arranged in the vicinities of the respective rectangular images. In addition, an intermediate color selecting button 711 used for selecting the intermediate color rectangular image 611 is arranged in the vicinity of the intermediate color rectangular image 611.

To summarize, the display unit may include a pressing detection unit that detects the pressing state of the display surface of the display unit, like a touch panel, for example. Accordingly, it is possible to display selection parts and intermediate color selection parts on the display unit. In addition, it becomes possible to use an image corresponding to each color displayed on the display unit as a selection part or intermediate color selection part.

In addition, the operating keys 203 of the operating panel 200 may be used as the selection parts and intermediate color selection parts. For example, it may be possible to implement the same effect if the operating keys 203 corresponding to the respective rectangular images are displayed in the vicinities of the rectangular images and intermediate color rectangular images, and a user performs the aforementioned operations using the corresponding operating keys 203.

In this connection, in the aforementioned embodiment, a configuration has been explained in which the intermediate color rectangular images continue to be displayed on the touch screen 201 until an erase operation is actively made by the user. However, since the display area of the touch screen 201 is limited, it may be considered that the operability is harmed if several intermediate color rectangular images are continuously displayed. For this reason, the intermediate color adding unit 403 may automatically erase the intermediate color rectangular images. For example, the intermediate color adding unit 403 erases a corresponding intermediate color rectangular image, for a case where two rectangular images are switched to the unselected state, which have been in the selected state and for which the intermediate color rectangular image corresponding to these two rectangular images has been displayed. It is possible to implement such a configuration if the display control unit 411 notifies the intermediate color adding unit 403 of the selection situation of the two rectangular images, based on which the calculation of the intermediate color rectangular image has been performed.

With this configuration, for example, when the user distances a finger from the rectangular image 602 of "blue 1" and the rectangular image 603 of "blue 2" in the state shown in the aforementioned FIG. 8, and both rectangular images 602 and 603 are switched to the unselected state, the display control unit 411 notifies the intermediate color adding unit 403 of this situation. The intermediate color adding unit 403 having received this notification interrupts the intermediate color addition with respect to the intermediate color rectangular image 611. In this manner, the intermediate color rectangular image 611 is erased from the touch screen 201.

With this configuration, it is possible to erase a displayed intermediate color rectangular image from the touch screen 201 without a special operation. For this reason, it is possible to display intermediate colors in succession between two different colors, such that the operability increases in searching for a desired color.

Figure 14:
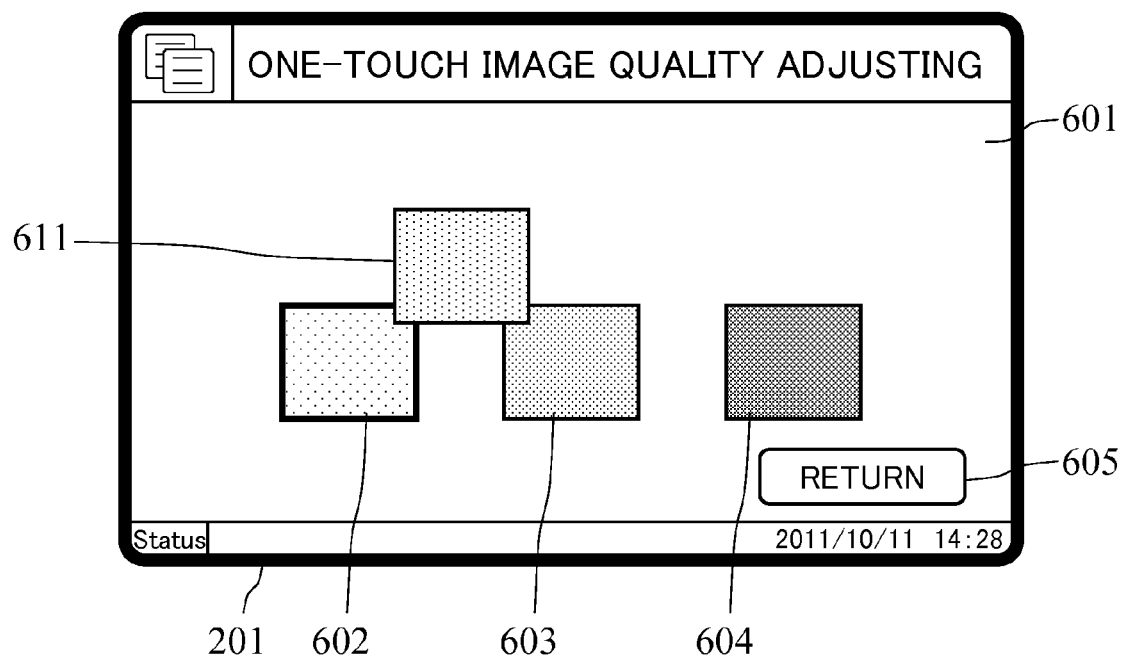
FIG. 14 is a diagram illustrating an example of a target color selection screen displayed by the MFP according to the embodiment of the present disclosure.
Figure 15:
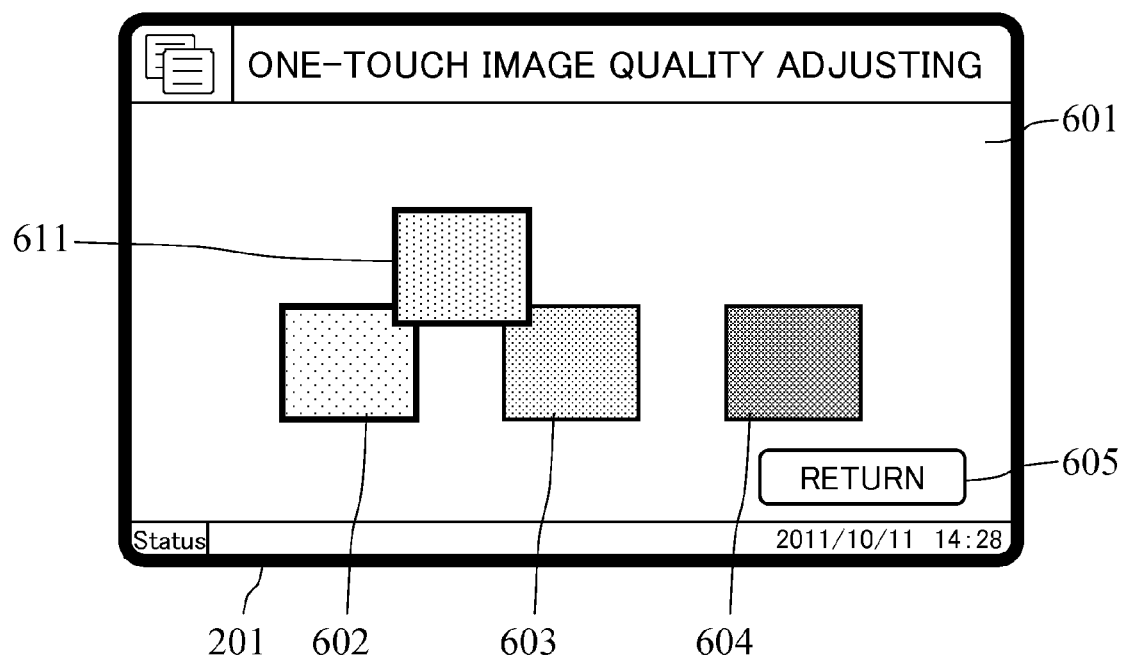
FIG. 15 is a diagram illustrating an example of a target color selection screen displayed by the MFP according to the embodiment of the present disclosure.

It should be noted that, in a case of selecting the intermediate color rectangular image 611 in this configuration, it is sufficient for a user to select the intermediate color rectangular image 611 while keeping the selected state of at least one of the rectangular images. For example, as shown in FIG. 14, the user distances a finger contacting the rectangular image 603 of "blue 2" to set it to the unselected state, while keeping the selected state of the rectangular image 602 of "blue 1". In this case, since the intermediate color adding unit 403 does not interrupt the intermediate color addition for the intermediate color rectangular image 611, the intermediate color rectangular image 611 is continuously displayed. For this reason, as shown in FIG. 15, the user can set the intermediate color rectangular image 611 to the selected state by touching the intermediate color rectangular image 611 with the finger distanced from the rectangular image 603 of "blue 2", for example. In this state, the user can set only the intermediate color rectangular image 611 to the selected state, if he/she distances a finger contacting the rectangular image 602 of "blue 1" to set the rectangular image 602 of "blue 1" to the unselected state, while keeping the selected state of the intermediate color rectangular image 611. It should be noted that, so long as the operation is not difficult, the user may set the intermediate color rectangular image 611 to the selected state by contacting the intermediate color rectangular image 611, while keeping the selected state of the rectangular image 602 of "blue 1" and the rectangular image 603 of "blue 2".

It should be noted that the aforementioned respective embodiments are not to limit the technical scope of the present disclosure, and that various modifications and applications are possible within the scope of the present disclosure. For example, although an explanation has been made with the above-mentioned embodiment, while exemplifying an operating procedure on a touch panel, this operating procedure is merely an exemplification. In other words, so long as association between an operation by the user and processing executed by the MFP is possible, the specific operating method thereof may be modified arbitrarily.

In addition, the images displayed on the target color selection screen 601 in the above-mentioned embodiment are not limited to rectangular shapes, and it may be possible to adopt any shapes. In addition, the display positions on the touch screen 201 may be changed arbitrarily.

Figure 16:
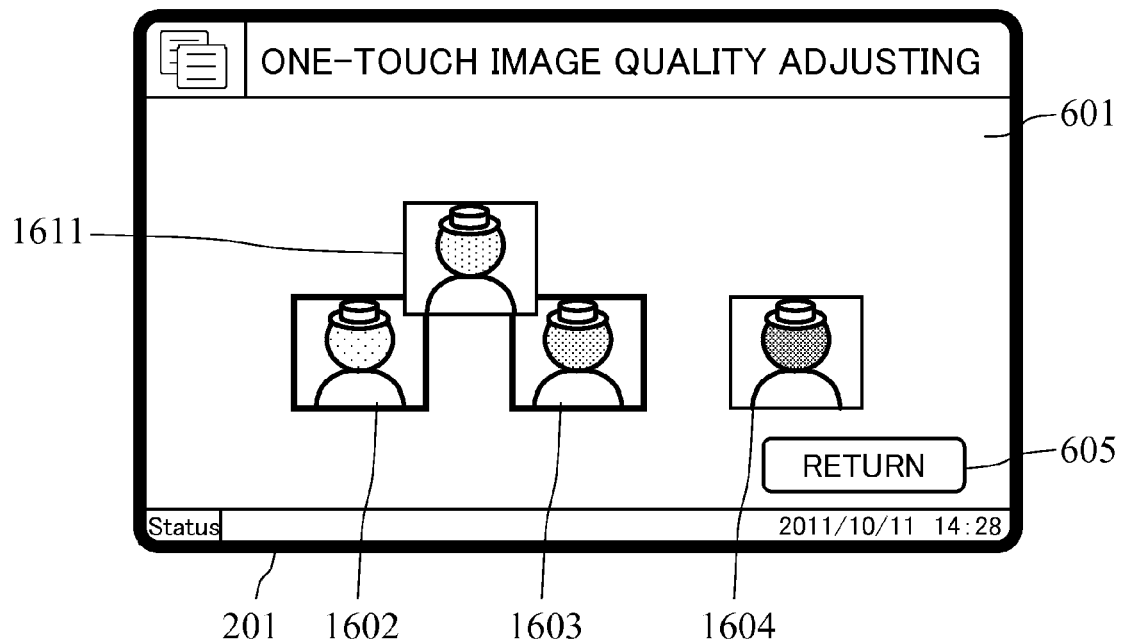
FIG. 16 is a diagram illustrating an example of a target color selection screen displayed by the MFP according to the embodiment of the present disclosure.

Furthermore, although the above-mentioned embodiment employs solid color images for the images displayed on the target color selection screen 601, it is not limited thereto. As shown in FIG. 16, the images displayed on the target color selection screen 601 may be images indicating the appearance according to image data after color correction performed by the color correction executing unit 413.

With the example of FIG. 16, the target color selection screen 601 includes thumbnail images 1602 to 1604 showing the appearance of image data in which color correction corresponding to the respective target colors has been executed on specific image data. It should be noted that, herein, flesh color is included only in the portion of a face in a thumbnail image, and the "portrait photograph" button 502 is selected on the color range selection screen 501 shown in FIG. 5. With this example, the thumbnail image 1602 corresponds to a first target color (hereinafter referred to as "flesh 1"), the thumbnail image 1603 corresponds to a second target color (hereinafter referred to as "flesh 2"), and the thumbnail image 1604 corresponds to a third target color (hereinafter referred to as "flesh 3"). For example, a pale skin color, a skin color giving a ruddy complexion impression, a skin color giving a suntanned impression, or the like may be set as the first to third target colors.

Although not particularly limited, each of the thumbnail images 1602 to 1604 may be generated in the color correction executing unit 413 according to the control of the display control unit 411. In this case, the display control unit 411 generates the thumbnail images 1602 to 1604 by reading color information associated with the color range selected on the color range selection screen 501 from the color information storage unit 401, and inputting colors indicated by this color information and specific image data to the color correction executing unit 413. As the specific image data, it may be possible to use any images such as thumbnail images of correction object image data, or images different from the correction object target data that is associated with each color range selected on the color range selection screen 501.

In the example of FIG. 16, the thumbnail image 1602 of "flesh 1" and the thumbnail image 1603 of "flesh 2" are in the selected state. In this case, the intermediate color calculating unit 402 calculates the color information of an intermediate color between "flesh 1" and "flesh 2" based on the color information of "flesh 1" and the color information of "flesh 2", and inputs the color information to the intermediate color adding unit 403. The intermediate color adding unit 403 displays the intermediate color thumbnail 1611 showing the appearance, for which color correction has been done with this intermediate color as the target color, on the touch screen 201 through the display control unit 411. Although not particularly limited, it may be that the inputted intermediate color and the aforementioned specific image data are inputted to the color correction executing unit 413, such that the intermediate color thumbnail image 1611 is generated in the color correction executing unit 413. In this example, since flesh color is included only in the portion of a face, the intermediate color thumbnail 1611 is displayed, in which the flesh color of the face has changed according to the intermediate color calculated by the intermediate color calculating unit 402.

As a result of establishing a configuration that displays a thumbnail image in this manner, it is possible for the user to more easily generate and select a color matching his/her imagination, since it is possible to visually confirm the image data to which the generated intermediate color is applied.

Furthermore, although the present disclosure has been embodied as a digital MFP in the above embodiments, it is not limited to the digital MFP. The present disclosure may be applied to any image processing apparatus such as a printer or a copying machine, or to any operating device including a display unit.

The invention claimed is:

1. An operating device comprising:
a color information storage unit configured to store color information representing a plurality of colors different from each other;
a display unit configured to display a plurality of images corresponding to the plurality of colors represented by the color information stored in the color information storage unit;
a plurality of selection parts configured to be respectively associated with the plurality of images displayed on the display unit, and to indicate whether a corresponding image is in a selected state or an unselected state;
an intermediate color calculating unit configured to calculate color information representing an intermediate color of two colors indicated by images respectively corresponding to two selection parts in the selected state, based on color information respectively corresponding to the two selection parts;
an intermediate color adding unit configured to execute an intermediate color addition to display an image corresponding to the intermediate color on the display unit, and to provide an intermediate color selection part indicating whether the image is in a selected state or an unselected state, based on color information of the intermediate color calculated by the intermediate color calculating unit; and
an output unit configured to output the color information of the intermediate color corresponding to the intermediate color selection part, if the intermediate color selection part is selected,
wherein the intermediate color adding unit continues the intermediate color addition if at least one of the two selection parts continues to be in the selected state, and interrupts the intermediate color addition if the two selection parts both transition to the unselected state.

2. The operating device according to claim 1, wherein the output unit registers the color information of the intermediate color corresponding to the intermediate color selection part in the color information storage unit, if the intermediate color selection part is selected.

3. The operating device according to claim 1,
wherein the display unit comprises a pressing detection unit configured to detect a pressed state of a display surface of the display unit, and
wherein the selection part and the intermediate color selection part are displayed on the display unit.

4. The operating device according to claim 3, wherein an image corresponding to each of the colors displayed on the displayed unit is also configured to concurrently function as the selection part or the intermediate color selection part.

5. An image processing apparatus comprising the operating device according to claim 1.

* * * * *